US008270787B2

(12) United States Patent
Sumetsky (10) Patent No.: US 8,270,787 B2
(45) Date of Patent: Sep. 18, 2012

(54) ADIABATIC COUPLER FOR COILED OPTICAL FIBER DEVICES

(75) Inventor: Mikhail Sumetsky, Bridgewater, NJ (US)

(73) Assignee: OFS Fitel, LLC, Norcross, GA (US)

( * ) Notice: Subject to any disclaimer, the term of this patent is extended or adjusted under 35 U.S.C. 154(b) by 329 days.

(21) Appl. No.: 12/592,567

(22) Filed: Nov. 27, 2009

(65) Prior Publication Data

US 2010/0209044 A1 Aug. 19, 2010

Related U.S. Application Data

(60) Provisional application No. 61/153,777, filed on Feb. 19, 2009, provisional application No. 61/156,565, filed on Mar. 2, 2009.

(51) Int. Cl.
*G02B 6/26* (2006.01)
*G02B 6/42* (2006.01)

(52) U.S. Cl. ............... 385/28; 385/31; 385/42; 385/43; 385/45

(58) Field of Classification Search .................. None
See application file for complete search history.

(56) References Cited

U.S. PATENT DOCUMENTS

| 6,707,975 B2 | 3/2004 | Bueschelberger et al. |
| 6,832,030 B2 * | 12/2004 | Gonthier ........................ 385/43 |
| 7,177,511 B2 * | 2/2007 | Vavassori et al. ............. 385/126 |
| 7,369,716 B2 | 5/2008 | Berg et al. |
| 2008/0063344 A1 | 3/2008 | Suzuki et al. |
| 2008/0101753 A1 | 5/2008 | Suzuki et al. |

OTHER PUBLICATIONS

Yao, Lei et al., "Low Bend Loss in Tightly-Bent Fibers Through Adiabatic Bend Transitions", Feb. 16, 2009/ vol. 17, No. 4, Optics Express, pp. 2962-2967.
Sumetsky, M., "Optical Microfibers: Fundamentals and Applications", CLEO 2006, CMGG1.

* cited by examiner

*Primary Examiner* — Charlie Peng
*Assistant Examiner* — Mary El Shammaa
(74) *Attorney, Agent, or Firm* — Law Offices of Wendy W. Koba

(57) ABSTRACT

An optical fiber coupler is formed of a section of optical fiber that is positioned between a conventional input fiber (for example, a single mode fiber) or waveguide and a coiled optical fiber device. The adiabatic coupler is coiled (or, at least, curved) to assist in transforming a conventional fundamental mode optical signal propagating along the longitudinal axis of the input fiber to an optical signal that is shifted into a peripheral region of the coiled optical fiber. Moreover, the pitch of an inventive coiled optical fiber coupler can be controlled to assist in the adiabatic transformation process.

17 Claims, 5 Drawing Sheets

ADIABATIC COUPLER FOR COILED OPTICAL FIBER DEVICES

CROSS-REFERENCE TO RELATED APPLICATIONS

This application claims the benefit of U.S. Provisional Application No. 61/153,777 filed Feb. 19, 2009 and U.S. Provisional Application No. 61/156,565 filed Mar. 2, 2009, both of which are hereby incorporated by reference.

TECHNICAL FIELD

The present invention relates to a coupler for use with coiled optical fiber devices and, more particularly, to a device for adiabatic transformation of a propagating optical signal into a preferred modefield distribution for an optical signal propagating in an optical fiber coil.

BACKGROUND OF THE INVENTION

Optical pulse buffers are important for optical communications and ultra-fast computing. An exemplary preferred type of buffer, comprising an optical fiber coil, is disclosed in my co-pending U.S. patent application Ser. No. 12/587,767, filed Oct. 13, 2008. In this preferred buffer, the radii of the optical fiber and coil are selected to confine the propagating fundamental mode in a region that is shifted away from the center of the optical fiber, thus significantly reducing both propagation loss and bend loss along the device.

While the confinement of the propagating mode to a shifted, peripheral region of the optical fiber improves the performance of the device, difficulties remain in coupling an input signal to the optical fiber coil, or extracting an optical signal therefrom. One problem may be associated with the large mismatch between the coil and a conventional input/output waveguide or fiber in terms of, for example, physical dimension, modefield diameter and propagation constant.

There remains a need for providing low loss coupling from a conventional fiber (or, perhaps, a planar waveguide) into or out of the shifted fundamental mode of an optical signal propagating along an optical fiber coil.

SUMMARY OF THE INVENTION

The need remaining in the prior art is addressed by the present invention, which relates to an adiabatic optical coupler for use with coiled optical fiber devices and, more particularly, to an optical coupler for providing adiabatic transformation of an optical input signal propagating along the longitudinal axis of an incoming waveguide into a preferred off-axis (i.e., "shifted") signal path along an optical fiber coil. As used throughout the specification, the term "adiabatic" (or the phrase "substantially adiabatic") is intended to define a transformation of the optical signal where the propagating mode is "maintained" (or "substantially maintained").

In accordance with the present invention, a section of optical fiber is utilized as an adiabatic optical coupler between a conventional input optical signal (propagating along an optical fiber or waveguide) and a coiled optical fiber device. The section of optical fiber may itself be coiled (or, at least, curved) to assist in transforming the conventional fundamental mode propagating along the longitudinal axis of the input fiber/waveguide to an off-axis fundamental mode that is shifted into a peripheral region of an associated coiled optical fiber device.

For embodiments where the adiabatic optical coupler is itself formed into a coil, the pitch of the coil can also be controlled to assist in the adiabatic transformation process.

In a preferred embodiment, the adiabatic optical fiber coupler remains physically separated from the turns of the associated coiled optical fiber device (as well as a central core rod, if included in the coiled optical fiber device) in order to ensure low loss transmission of the fundamental mode, without coupling any signal into the central core rod or individual turns of the coil.

Other embodiments and aspects of the present invention will become apparent during the course of the following discussion and by reference to the accompanying drawings.

BRIEF DESCRIPTION OF DRAWINGS

So the manner in which the above-recited features of the present invention can be understood in detail, a more particular description of embodiments of the present invention, briefly summarized above, may be had by reference to embodiments that are illustrated in the appended drawings. It is to be noted, however, that the appending drawings illustrate only typical embodiments of the various embodiments encompassed within the scope of the present invention and, therefore, are not to be considered limiting, for the present invention may admit to other equally effective embodiments, wherein:

FIG. 8 (a) illustrates the conformal transformation of a curved optical fiber into a straight optical fiber;

The headings used herein are for organizational purposes only and are not meant to be used to limit the scope of the description or the claims. As used throughout this application, the term "may" is used in a permissive sense (i.e., meaning "having the potential to"), rather than the mandatory sense (i.e., meaning "must"). Similarly, the terms "include", "including" and "includes" are considered to mean "including, but not limited to". To facilitate understanding, like reference numerals have been used, where possible, to designate like elements common to the figures.

DETAILED DESCRIPTION

Figure 1A:
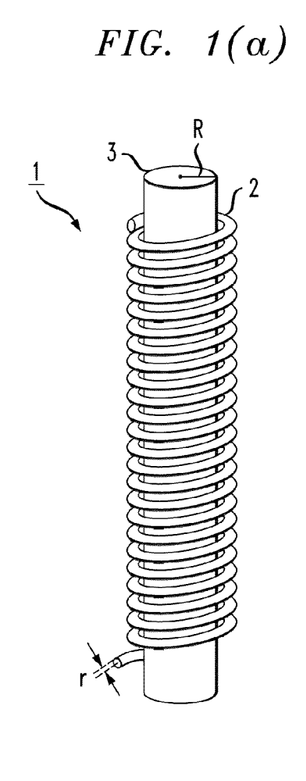
FIG. 1 illustrates an exemplary optical fiber coil optical device as fully described in co-pending application Ser. No. 12/587,767.
Figure 1B:
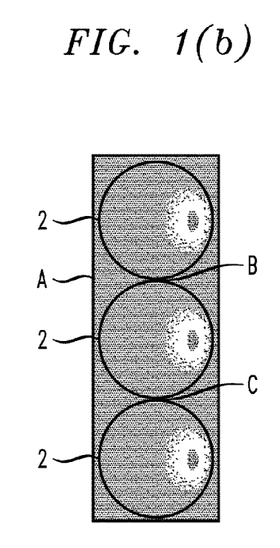

FIG. 1(a) illustrates an exemplary optical fiber coil 1 as disclosed in my co-pending application. The propagating fundamental mode is shown in FIG. 1(b) as being confined to an extreme outer peripheral region of each turn 2 of optical fiber along the coil. By confining the propagating mode to this region, the coupling between adjacent turns—as well as between the turns and a central core rod 3—is significantly reduced, allowing for propagation with little or no scattering and/or bending losses.

While this configuration is considered a significant improvement over other types of optical delay devices, the ability to couple a propagating signal into or out of the desired extreme peripheral region of the fiber coil remains problematic. A suitable coupling arrangement needs to also address the physical size differences between standard input/output waveguides or fibers and the "micro" dimensions of an optical microfiber when using a microfiber to form coil 1.

Figure 2:
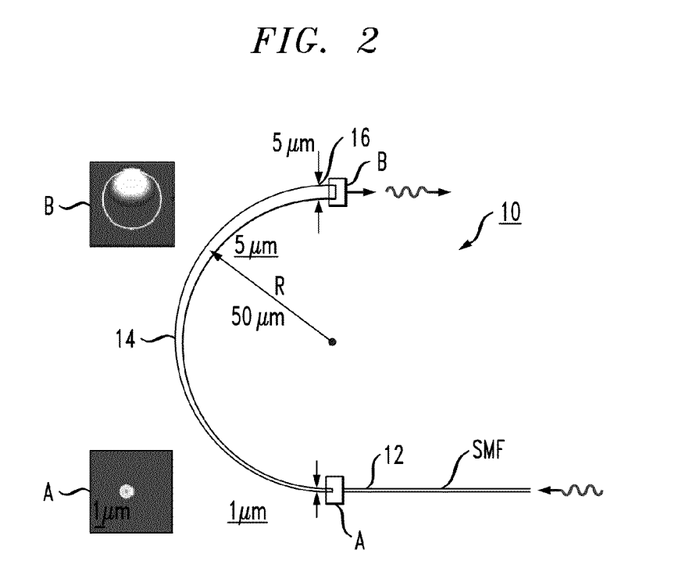
FIG. 2 illustrates an exemplary adiabatic tapered optical fiber coupler formed in accordance with the present invention.

The present invention addresses these concerns, with FIG. 2 illustrating an exemplary adiabatic tapered optical fiber coil coupler 10. As will be discussed in detail below, coupler 10 first couples a propagating optical signal from a single mode waveguide or fiber into a 'straight' section of optical microfiber. In an exemplary implementation of the present invention, an optical microfiber is used to form coupler 10 and is defined as a fiber having a diameter on the order of, for example, 5-100 μm, and may have no appreciable difference between the material or properties of a "core" region and a "cladding" region. The propagating optical signal thus continues to propagate along the longitudinal axis as it transfers from the single mode input signal path to the straight section of optical microfiber. A subsequent length of the microfiber is then outwardly tapered and curved (and, perhaps, coiled) to adiabatically transition the propagating signal into an off-axis signal that is shifted and confined to an extreme peripheral region of the microfiber coil. This specific configuration, utilizing an optical microfiber, is considered to be exemplary only, inasmuch as the principles of the present invention are equally applicable to arrangements using conventional fibers in the formation of a coiled device.

Referring to particular components in the embodiment of FIG. 2, adiabatic coupler 10 is shown as including an input section 12 of optical fiber, which is coupled to an end termination of an input waveguide or fiber. At this point, input section 12 is shown as having (in this particular embodiment) a diameter of approximately one micron and supports a the propagating fundamental mode of an optical signal along its longitudinal axis. In accordance with the present invention, adiabatic coupler 10 further comprises an adiabatic transition section 14 formed of a curved section of optical fiber. In this instance, adiabatic transition region 14 is shown to have a radius of curvature R on the order of fifty microns. As further shown, adiabatic transition section 14 further exhibits an increase in fiber diameter d expanding outward from the one micron value at the interface with input section 12 to, in this case, a width of five microns. An output coupling section 16, which comprises another section of optical fiber, is shown as disposed beyond adiabatic transition section 14. In this embodiment, output coupling section 16 comprises an optical fiber of essentially constant diameter.

Also shown in FIG. 2 are diagrams of the modefield distributions at input location A and output location B of adiabatic coupler 10. A circular modefield distribution is shown at the input (diagram A), with respect to the center of input section 12 of adiabatic coupler 10. By the time the signal has propagated through adiabatic transition section 14 and entered output coupling section 16, the modefield has shifted to an extreme peripheral portion of the (larger) optical fiber, now exhibiting a modefield distribution as shown in diagram B. Comparing this modefield distribution to that associated with the optical fiber coil of FIG. 1(b), it is clear that adiabatic optical coupler 10 of the present invention is capable of forming an input signal that can be coupled into an optical fiber coil with little, if any, loss.

Figure 3:
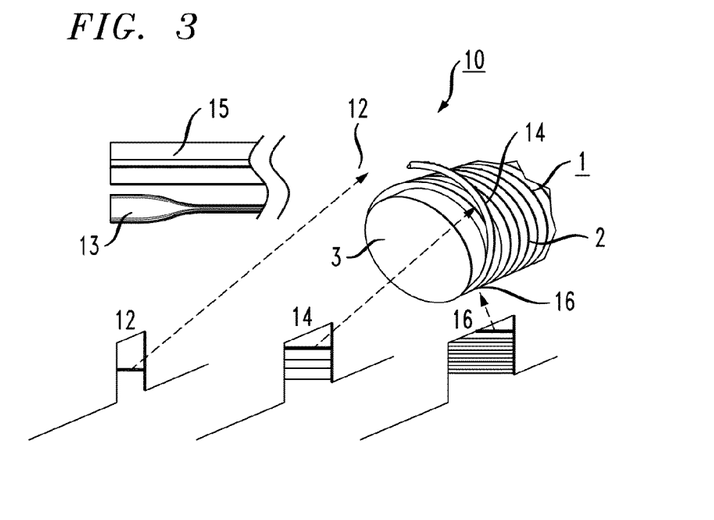
FIG. 3 is a diagram illustrating the connections between an input optical signal path, an adiabatic coupler and an associated optical fiber coil.

FIG. 3 is a diagram illustrating the connections between an input optical signal path, adiabatic coupler 10 and optical fiber coil 1. As described above and further discussed below, the input optical signal path may comprise an input optical fiber, shown as optical fiber 13 in FIG. 3, or a planar optical waveguide, shown as waveguide 15 in FIG. 3, or any other suitable mode of providing single mode optical signal propagation. It is an aspect of the coupler configuration of the present invention that coupler 10 should not come into contact with core rod 3 of optical fiber coil 1 until the mode has shifted to the outer peripheral region of the microfiber—as shown in diagram B of FIG. 2. Otherwise, contact between coupler 10 and core rod 3 will result in the unwanted coupling of a portion of the propagating signal into core rod 3.

Also shown in FIG. 3 is the evolution of the transverse eigenvalues of the propagating modes along the length of adiabatic coupler 10. The diagram associated with input section 12 of coupler 10 illustrates only the fundamental mode as being supported along the optical fiber. The dark line represents the effective index of the propagating mode relative to the index profile of the optical fiber. As is well known in the art, the profile is tilted to represent the influence of bending on the waveguiding properties of the optical fiber. As the optical fiber becomes larger in diameter, additional modes appear, as shown in the diagram associated with adiabatic transition section 14. The inclusion of the curvature in conjunction with the larger diameter allows for the fundamental mode (shown as the darker line in the diagrams) to be retained; that is, an adiabatic (mode-preserving) transition occurs. Further increase of the fiber diameter introduces more modes at output coupling section 16, while still retaining the adiabatic transition of the fundamental mode. It is to be noted that at output coupling section 16, the mode represented by the dark line is displaced relative to the center of the waveguide. In accordance with the present invention, output coupling section 16 of adiabatic coupler 10 is then directly connected to optical fiber coil 1 (using a fused fiber technique, for example) to form the final structure.

In accordance with the present invention, therefore, an incoming single mode signal is first coupled into an optical fiber in a manner which maintains the distribution of the fundamental mode about the longitudinal axis of the waveguide. An adiabatic transformation is then performed to shift this signal off-axis to an outer peripheral region of the optical fiber. This transformation is provided in an adiabatic manner to maintain the propagation of the fundamental mode of the signal.

It is to be understood that while the concepts of the present invention have been described up to this point in the form of an "input" coupler, the same principles may be applied to form an "output" coupler, which is connected to the output of exemplary optical fiber coil 1. In this case, an output coupler would first transition the output signal propagating along an outer peripheral region of the fiber back towards the longitudinal axis of an output waveguide through an adiabatic transition region that retains the fundamental mode.

Figure 4:
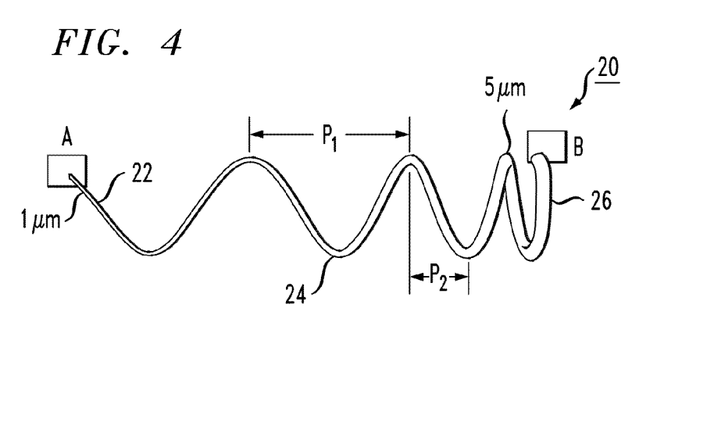
FIG. 4 illustrates an exemplary coiled and tapered adiabatic optical fiber coupler formed in accordance with the present invention.

FIG. 4 illustrates an alternative adiabatic coupler 20 formed in accordance with the present invention. In this example, adiabatic coupler 20 includes an input coupling section 22, again comprising a section of optical fiber having a diameter on the order of one micron. As with the embodiment discussed above, input coupling region 22 is used to couple a propagating single mode optical signal (from an optical fiber or planar waveguide, for example) into the coupler. An adiabatic transition section 24 is then formed of a section of optical fiber (in this particular example, an optical microfiber) which expands in diameter from about one micron to about five microns, where in this case the optical fiber is coiled in the manner shown in FIG. 4. By decreasing the spacing between adjacent turns in the coil forming adiabatic transition section 24, the propagating optical signal is shifted to the desired outer peripheral region of the optical fiber (see diagram B in FIG. 2). This configuration is defined as exhibiting a variable coil "pitch", where the pitch defines the spacing between adjacent turns of a coil, examples being $P_1$ and $P_2$ in FIG. 4. An output coupling section 26, having the same dimensions as an associated optical fiber coil (not shown), is then used to ultimately couple the propagating signal into the optical fiber coil.

Figure 5:
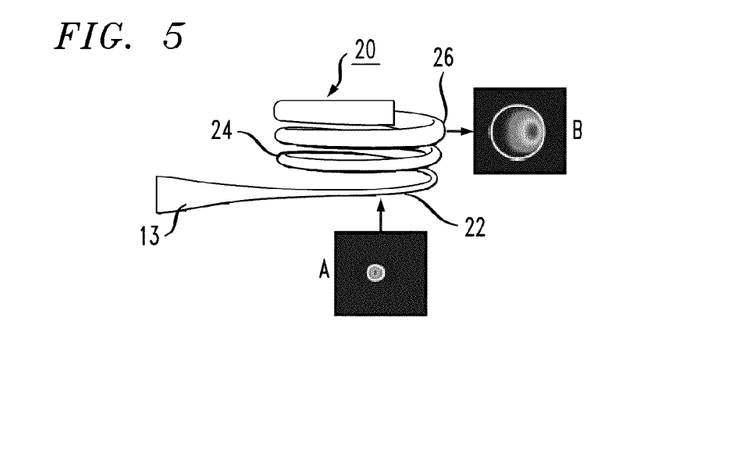
FIG. 5 shows the coupler of FIG. 4 in association with an input optical fiber.
Figure 6:
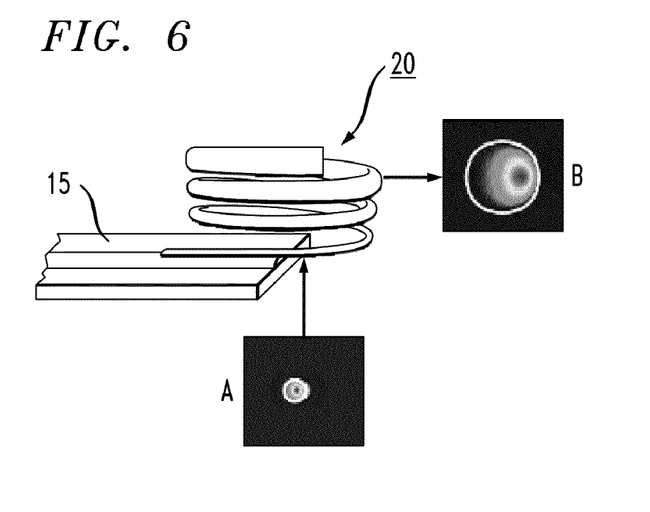
FIG. 6 shows the coupler of FIG. 4 in association with an input optical waveguide.

FIG. 5 illustrates adiabatic coupler 20 as used in conjunction with input optical fiber 13. Also shown in FIG. 5 is the incoming, circular fundamental mode of the propagating signal at the junction between optical fiber 13 and input coupling section 22 of adiabatic coupler 20 (diagram A). The shifted output from coupler 20, appearing along output coupling section 26, is shown in diagram B in FIG. 5. FIG. 6 is a similar arrangement, in this case coupling planar waveguide 15 to adiabatic coupler 20.

Figure 7:
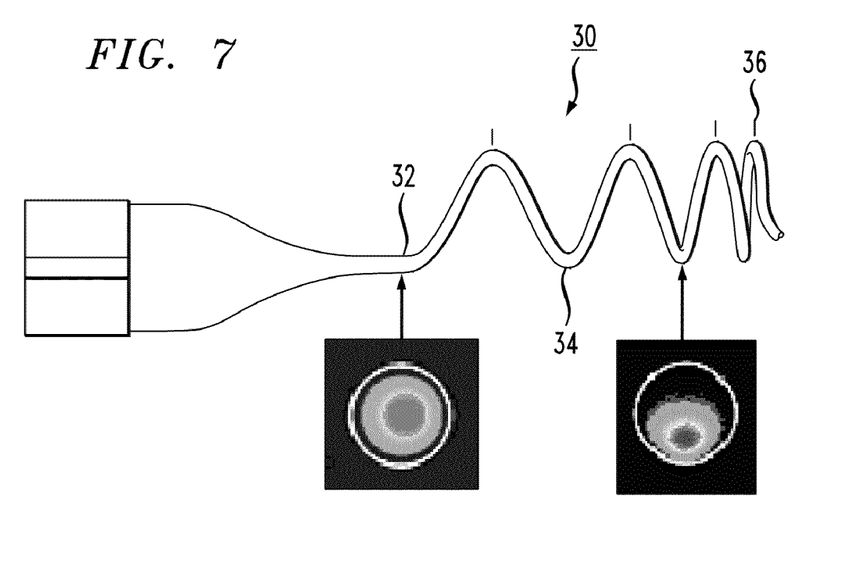
FIG. 7 illustrates another embodiment of the present invention, utilizing an adiabatic optical fiber coupler formed as a coil having both a constant fiber radius and coil radius of curvature, using a variable pitch of the coil to provide the adiabatic transformation.

FIG. 7 shows yet another embodiment of the present invention, where in this case an adiabatic coupler 30 comprises a section of optical fiber with a constant diameter—in contrast to the use of tapered fibers in the embodiments discussed above. As shown, coupler 30 includes an input coupling section 32 of optical fiber, followed by an adiabatic transition section formed as a coil, with an ever-decreasing pitch between adjacent coils. A bend-induced adiabatic transition causes the propagating fundamental mode to shift from its initial propagation along the longitudinal axis of the fiber to an off-axis position, as shown along output coupler section 36. Without the use of a tapered fiber, however, a longer length of optical fiber (compared to coupler 20) is required to form the adiabatic transition section. However, in systems where the formation of optical fiber tapers, particularly in microfiber, is problematic, the embodiment of FIG. 7 may be preferred.

In each of these embodiments, the fundamental mode is propagating along longitudinal axis of the optical signal path prior to transformation. This is considered to be an important aspect of the adiabatic coupler of the present invention, since transformation of this signal to an off-axis, shifted location is more compact than prior art arrangements which first require coupling the signal out of a single mode fiber. The adiabatic coupler of the present invention can be accomplished with higher extinction, coupling less power into unwanted modes of the microfiber than prior art couplers. Further, prior arrangements did not take advantage of the benefit of controlling the spatial location of the shifted mode to reduce overlap with the central rod or glass surface of the microfiber (reducing loss).

As an example, consider a curved adiabatic coupler, such as coupler 10, with constant radius r and bend radius R(z) which is changing from a very large value $R_0$ at z=0 (corresponding to the optical fiber input coupling section) to the coil radius R according to the law $$R(z) = \frac{2(R_0 - R)}{\exp(z^2/L^2) + 1} + R.$$

Figure 8A:
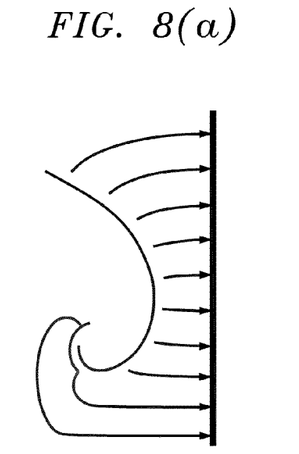
Figure 8B:
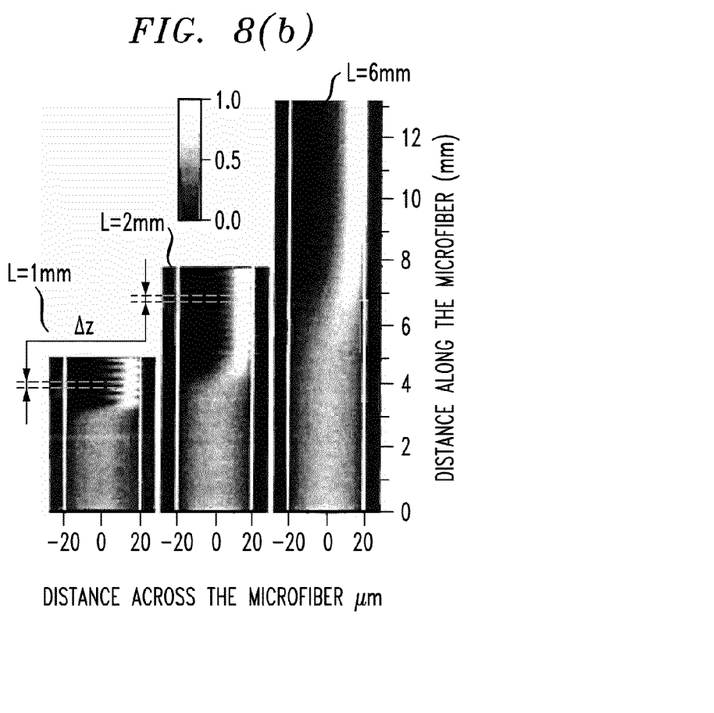
FIG. 8(b) shows the results of numerical simulation for a set of different transition lengths.

Here, L is the characteristic length of the transition region. Bending is modeled with a vector beam propagation model (BPM) by introduction of a local effective index variation corresponding to the local optical fiber curvature, as shown in FIG. 8(a), which illustrates the conformal transformation of a curved optical fiber into a straight optical fiber. In this example, the fiber radius is set to r=10 μm and the final coil radius is set to R=1 mm. FIG. 8(b) shows the results of numerical simulation (surface plots) for the transition lengths L=1, 2, and 6 mm. In surface plot 1, L=1 mm and the launched fundamental mode of a straight microfiber experiences non-adiabatic transformation, which causes excitation of at least two modes, $E_{00}$ and $E_{01}$. Interference of these modes shows up in oscillations of the field amplitude in the region of the coiled microfiber. The period of these oscillations can be found from the following equation:

$$\Delta z = 2^{\frac{1}{3}}(t_1 - t_0)^{-1}(2\pi R)^{2/3}(\lambda/n_f)^{1/3} = 245.1 \text{ μm}.$$

This value is in agreement with the period $\Delta z \approx 245$ μm found from the surface plot 1 of FIG. 8(b). In surface plot 2, L=2 mm and the transition region is still non-adiabatic, as indicated by oscillation of the field in the region of the coiled optical fiber. The period of oscillations found from surface plot 2, $\Delta z \approx 245$ μm, is again in excellent agreement with the prediction from the above equation. Finally, in surface plot 3, which corresponds to the transition length L=6 mm, no field oscillations are observed and the launched axially symmetric fundamental mode is adiabatically transformed into the shifted fundamental mode of the coiled microfiber. The total length of this adiabatically bent optical fiber is less than 10 mm, i.e., it does not exceed the length of two turns of an optical fiber coil with 1 mm radius of curvature.

Adiabatic propagation along the fundamental mode of a coiled adiabatic coupler, such as coupler 20, is performed with exponentially small losses if the characteristic taper length, $L_t$, satisfies the adiabatic condition $L_t \gg 1/(\beta_1 - \beta_0)$, where $\beta_1 - \beta_0$ is the smallest separation between the propagation constant of the fundamental mode, $\beta_0$, and $\beta_1$ is the propagation constant of the next-highest mode that is excited by the introduced deformation. For a coiled optical fiber taper with monotonically decreasing separation of propagation constants, the adiabatic condition can be derived from the following:

$$L_t \gg \frac{1}{\min\left(1.3\beta^{\frac{1}{3}}R^{-\frac{2}{3}}, (Rr)^{-\frac{1}{2}}\right)}.$$

Figure 9A:
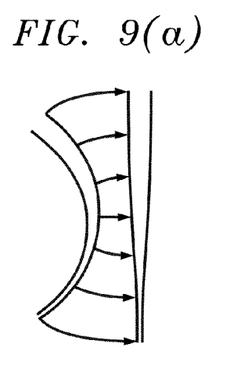
FIG. 9(a) illustrates the conformal transformation of a coiled optical fiber into a straight optical fiber.
Figure 9B:
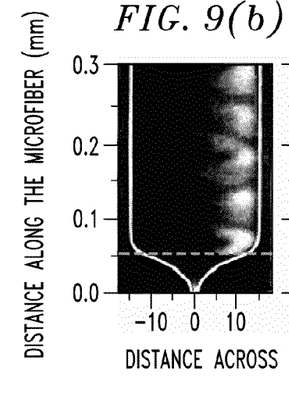
FIG. 9(b) shows the propagation of the fundamental mode for a first taper length.
Figure 9C:
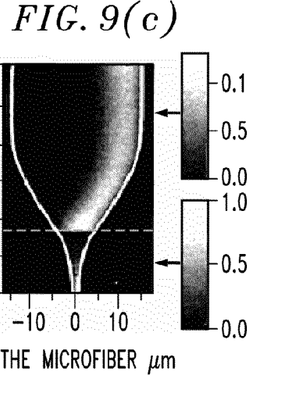
FIG. 9(c) shows the propagation of the fundamental mode for a second, longer taper length.

As an example, consider transformation of the fundamental mode of a single-mode optical fiber into the shifted mode of an optical fiber coil which has the parameters: R=2.5 mm, r=15 µm, λ=1.5 µm, and $n_f$=1.5. Then, the above relation yields $L_t$>>0.2 mm. The numerical simulation shown in FIG. 9 confirms that the requested transformation becomes low loss at $L_t$~1 mm. Modeling of the bent optical fiber taper was performed with the vector BPM and conformal transformation, where a bend taper with refractive index $n_f$ was replaced by a straight taper with the effective refractive index $n_f(1+x/R)$, as illustrated in FIG. 9(a). The taper radius variation was chosen in the form $r(s)=r_0+(r-r_0)[1-\exp(-s^2/s_0^2)]/[1+\exp(-s^2/s_0^2)]$ with $r(0)=r_0$ and $r(\infty)=r$. The initial and final radii of the taper are set to $r_0$=1 µm and r=15 µm, respectively. FIG. 9(b) shows the propagation of the fundamental mode launched at s=0 along the taper with $z_0$=0.3 mm. It is seen that this taper is non-adiabatic and several interfering modes are excited. FIG. 9(c) shows the propagation of the same mode along a longer taper with $z_0$=1 mm. In this case, the taper adiabatically transforms the initial mode into a shifted fundamental mode of the coiled optical fiber. No transmission loss was detected within the accuracy of calculations. The size of the adiabatic taper shown in FIG. 9(c) is negligible compared to the dimensions of an exemplary optical fiber coil device: its total length is only ~2.5 mm, i.e., close to the diameter of an exemplary microfiber coil device.

Figure 10A:
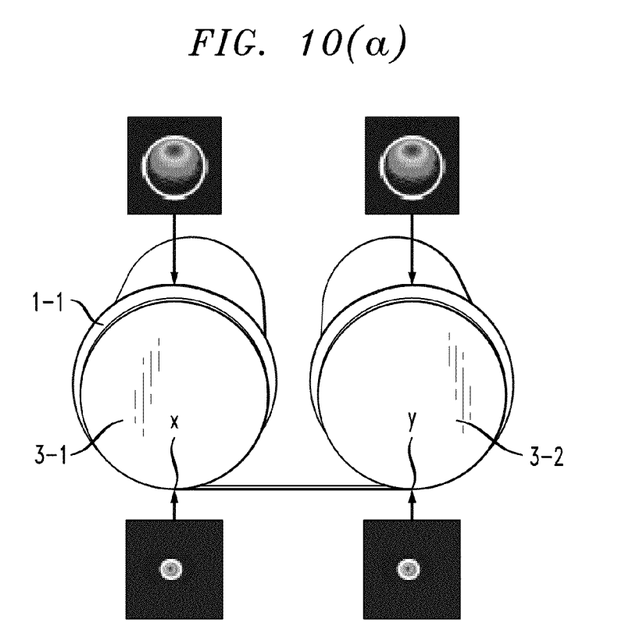
FIG. 10(a) illustrates a prior art configuration for coupling together two separate optical fiber coil devices.

As mentioned above, an aspect of the adiabatic optical fiber coupler of the present invention is that the fiber itself preferably remains in a spaced-apart arrangement with the optical fiber coil. FIG. 10 illustrates this concept in an arrangement for interconnecting two separate optical fiber coil devices. FIG. 10(a) can be considered as a prior art arrangement, with a length of optical fiber extending from a first optical fiber coil 1-1 and thereafter coiled around a second optical fiber coil 1-2. Inasmuch as the optical fiber remains in contact with central core rod 3-1 until extending to second optical fiber coil 1-2 (illustrated as point X in FIG. 10(a)), coupling of the propagating signal from the optical fiber into core rod 3-1 can occur. Similarly, additional loss will occur as the optical fiber contacts second central core rod 3-2 at point Y.

Figure 10B:
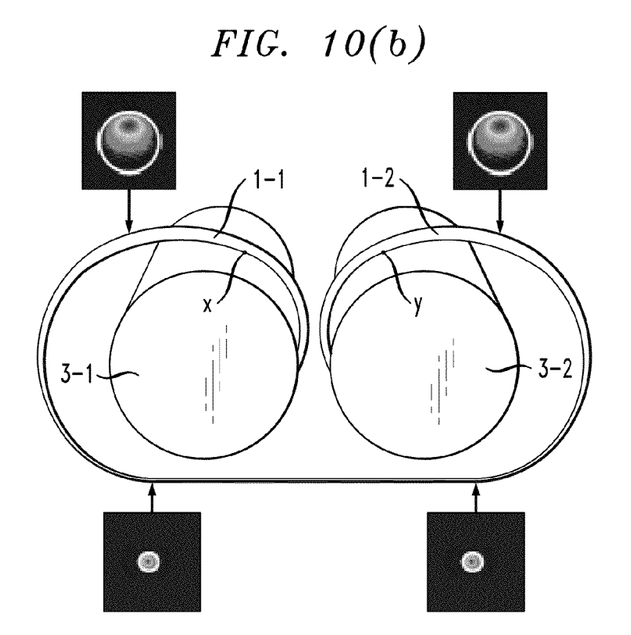
FIG. 10(b) illustrates a coupling arrangement for interconnecting a pair of optical fiber coils in accordance with the present invention.

In contrast, and in association with the present invention, an adiabatic tapered optical fiber coupler is used to interconnect coils 1-1 and 1-2, in the manner shown in FIG. 10(b). In this case, the portion of fiber used to provide the interconnection is first extended away from central core rod 3-1 at point x, where thereafter the optical fiber is tapered and curved to provide an adiabatic transformation from the shifted, peripheral location of the coil into a conventional optical signal propagating along the longitudinal axis of a single mode microfiber. The optical fiber remains separated from both coils as shown in FIG. 10(b), as the fiber nears second optical fiber coil 1-2. Prior to coupling into optical fiber coil 1-2, the coupling optical fiber is curved and enlarged in diameter, in the manner discussed above, to shift the optical signal propagating along the longitudinal axis into the peripheral region associated with along second coil 1-2. Advantageously, by maintaining a separation between the adiabatic coupler and the fiber coils, propagation and coupling losses are minimized.

While the present invention has been particularly described and shown with reference to particular embodiments, it should be understood by those skilled in the art that various changes in form and detail may be made therein without departing from the spirit and scope of the present invention as defined by the claims appended hereto.

What is claimed is:

1. An optical fiber coupler, comprising:
an input section of optical fiber for supporting the propagation of a fundamental mode of an optical signal along a longitudinal axis thereof;
a substantially adiabatic transition section of optical fiber coupled to an output of the input section, the substantially adiabatic transition section of optical fiber having a radius r and a radius of curvature R that are controlled to shift the propagating fundamental mode of the optical signal into an outer peripheral region of the substantially adiabatic transition section; and
an output section of optical fiber coupled to an output of the substantially adiabatic transition section for receiving the shifted propagating optical signal, wherein the substantially adiabatic transition section of optical fiber is curved to form a coil, the coil exhibiting an expanding radius r(·) to maintain propagation of the fundamental mode from the output of the input section to the input of the output section.

2. An optical fiber coupler as defined in claim 1 wherein the input section of optical fiber comprises a section of single mode optical fiber.

3. An optical fiber coupler as defined in claim 1 wherein the output section of optical fiber comprises a section of single mode optical fiber.

4. An optical fiber coupler as defined in claim 1 wherein the substantially adiabatic transition section coil exhibits a constant pitch.

5. An optical fiber coupler as defined in claim 1 wherein the substantially adiabatic transition section coil exhibits a variable pitch.

6. An optical fiber coupler as defined in claim 5 wherein the substantially adiabatic transition section coil exhibits a monotonically decreasing pitch.

7. An optical fiber coupler, comprising
an input section of optical fiber for supporting the propagation of a fundamental mode of an optical signal along a longitudinal axis thereof;
a substantially adiabatic transition section of optical fiber coupled to an output of the input section, wherein the substantially adiabatic transition section comprises a section of coiled optical fiber of a constant radius r so as to maintain propagation of the fundamental mode of the optical signal while shifting the propagating fundamental mode from the longitudinal axis of the input fiber section to the outer peripheral region of the coiled adiabatic transition section; and
an output section of optical fiber coupled to an output of the substantially adiabatic transition section for receiving the shifted propagating optical signal.

8. An optical fiber coupler as defined in claim 7 wherein the coiled optical fiber exhibits a variable coil pitch.

9. An optical fiber coupler as defined in claim 7 wherein the coiled optical fiber has an expanding diameter and a variable coil pitch.

10. An optical transmission arrangement comprising:
an optical fiber coil delay element; and
an input optical fiber coupler for receiving a propagating optical signal and coupling the propagating optical signal into the optical fiber coil delay element, the input optical fiber coupler comprising:
an input section of optical fiber for supporting the propagation of a fundamental mode of an optical signal along a longitudinal axis thereof;
a substantially adiabatic transition section of optical fiber coupled to an output of the input section, the substantially adiabatic transition section having a radius r and a radius of curvature R controlled to shift the propagating fundamental mode of an optical signal into an outer peripheral region of the adiabatic transition section; and an output section of optical fiber coupled to an output of the substantially adiabatic transition section for receiving the shifted fundamental mode of the propagating optical signal and coupling the shifted fundamental mode of the propagating optical signal into the optical fiber coil delay element.

11. An optical transmission arrangement as defined in claim 10, wherein the arrangement further comprises:

an output optical fiber coupler for receiving the now-delayed, propagating optical signal from the optical fiber coil delay element, the output optical fiber coupler comprising:

an input section of optical fiber for supporting the propagation of the shifted fundamental mode of an optical signal propagating along the optical fiber coil;

a substantially adiabatic transition section of optical fiber coupled to an output of the input section, the substantially adiabatic transition section exhibiting a radius r and radius of curvature R that are controlled to transform the propagating, shifted fundamental mode of an optical signal into an optical signal propagating along a longitudinal axis thereof; and an output section of optical fiber coupled to the output of the substantially adiabatic transition section for receiving the propagating optical signal.

12. An optical transmission arrangement as defined in claim 10 wherein the input optical coupler remains in a spaced-apart relationship with the optical fiber coil delay element to minimize evanescent coupling therebetween.

13. A method of coupling a propagating signal into an optical fiber coil delay element in arrangements where the optical fiber coil supports propagation of a fundamental mode of an optical signal confined to an outer peripheral region of the optical microfiber, the method comprising the steps of:

coupling an optical signal propagating along a longitudinal axis into an input section of single mode optical fiber;

introducing the propagating optical signal into a substantially adiabatic transition section of optical fiber, the substantially adiabatic transition region exhibiting a radius r and a radius of curvature R that are controlled to shift the propagating fundamental mode of an optical signal to an outer peripheral region of the substantially adiabatic transition section; and coupling the shifted fundamental mode of the propagating optical signal into the optical fiber coil.

14. The method as defined in claim 13, wherein in performing step b), the propagating optical signal is transformed by expanding the radius r of the optical fiber forming the transition region and bending the optical fiber to exhibit a predefined radius of curvature R.

15. The method as defined in claim 14 wherein the optical fiber is curved into a coil.

16. The method as defined in claim 15 wherein the coil is formed to exhibit a constant pitch.

17. The method as defined in claim 15 wherein the coil is formed to exhibit a variable pitch.

* * * * *